(12) United States Patent
Habel et al.

(10) Patent No.: US 9,401,043 B2
(45) Date of Patent: Jul. 26, 2016

(54) PHOTON BEAM DIFFUSION

(71) Applicant: Pixar, Emeryville, CA (US)

(72) Inventors: Ralf Habel, Zurich (CH); Wojciech Jarosz, Zurich (CH)

(73) Assignee: Pixar, Emeryville, CA (US)

( * ) Notice: Subject to any disclaimer, the term of this patent is extended or adjusted under 35 U.S.C. 154(b) by 545 days.

(21) Appl. No.: 13/913,001

(22) Filed: Jun. 7, 2013

(65) Prior Publication Data

US 2014/0204087 A1 Jul. 24, 2014

Related U.S. Application Data

(60) Provisional application No. 61/754,499, filed on Jan. 18, 2013.

(51) Int. Cl.
*G06T 15/50* (2011.01)

(52) U.S. Cl.
CPC ................................... *G06T 15/506* (2013.01)

(58) Field of Classification Search
None
See application file for complete search history.

(56) References Cited

U.S. PATENT DOCUMENTS

| | | | | |
|---|---|---|---|---|
| 2009/0109220 A1* | 4/2009 | Tomson | ................. | G06T 15/506 345/424 |
| 2009/0254293 A1* | 10/2009 | Tartaglia | ................. | G06T 15/50 702/85 |
| 2012/0038644 A1* | 2/2012 | Jones | .................... | G06T 15/506 345/426 |
| 2012/0299914 A1* | 11/2012 | Kilpatrick | ............... | G06T 15/50 345/420 |

OTHER PUBLICATIONS

Rosana Soldado, Importance Sampling Method for Aribtrary BRDFs in Global Illumination Applications, 2008, Doctoral Dissertation, University of Granada, Granada, Spain.*
Mark Colbert, Simon Premoze, Guillaume François, Importance Sampling for Production Rendering, 2010, Siggraph 2010 Course, 37th International Conference and Exhibition on Computer Graphics and Interactive Techniques, Los Angeles, CA.*
Chandrasekar, S. 1960. *Radiative Transfer*. Dover Publications.
D'Eon, E., and Irving, G. 2011. A quantized-diffusion model for rendering translucent materials. *ACM Transactions on Graphics (Proc. SIGGRAPH)* 30, 4.
D'Eon, E., Luebke, D., and Enderton, E. 2007. Efficient rendering of human skin. In *Rendering Techniques 2007: 18th Eurographics Workshop on Rendering*, 147-158.
Donner, C., and Jensen, H. W. 2005. Light diffusion in multilayered translucent materials. *ACM Transactions on Graphics (Proc. SIGGRAPH)* 24, 3.
Donner, C., and Jensen, H. W. 2007. Rendering translucent materials using photon diffusion. In *Rendering Techniques 2007: 18th Eurographics Workshop on Rendering*, 243-252.

(Continued)

*Primary Examiner* — Michael J Cobb
(74) *Attorney, Agent, or Firm* — Kilpatrick Townsend & Stockton LLP

(57) ABSTRACT

An efficient numerical method for accurately rendering translucent materials using photon beam diffusion is provided that can account for multilayer materials and directional incident and exitant effects at the surface. In an embodiment, refracted incident light is represented continuously as a photon beam instead of as discrete photons. An integration scheme for calculating a radiant exitance value at a point on the surface of the translucent material is disclosed that uses importance sampling and evaluates a radiant function at a limited number of points along the beam.

20 Claims, 10 Drawing Sheets

(56) References Cited

OTHER PUBLICATIONS

Farrell, T., Patterson, M. S., and Wilson, B. 1992. A diffusion theory model of spatially resolved, steady-state diffuse reflectance for the noninvasive determination of tissue optical properties in vivo. *Med. Phys* 19, 4, 879-888.

Habel, Ralf et al., "Photon Beam Diffusion: A Hybrid Monte Carlo Method for Subsurface Scattering", Computer Graphics Forum (Proceedings of the Eurographics Symposium on Rendering 2013), vol. 32, No. 4, 11 pages.

Jarosz, W., Nowrouzezahrai, D., Sadeghi, I., and Jensen, H. W. 2011. A comprehensive theory of volumetric radiance estimation using photon points and beams. ACM Transactions on Graphics (*Proc. SIGGRAPH*) 30, 1.

Jarosz, W., Nowrouzezahrai, D., Thomas, R., Sloan, P.-P., and Zwicker, M. 2011. Progressive photon beams. *ACM Transactions on Graphics (Proc. SIGGRAPH Asia)* 30, 6.

Jarosz, W., Zwicker, M., and Jensen, H. W. 2008. The beam radiance estimate for volumetric photon mapping. *Computer Graphics Forum (Proc. of Eurographics)* 27, 2.

Jensen, H. W. 1996. Global illumination using photon maps. In *Proc. of Eurographics Rendering Workshop*.

Jensen, H. W., and Buhler, J. 2002. A rapid hierarchical rendering technique for translucent materials. *ACM Transactions on Graphics (Proc. SIGGRAPH)* 21, 3.

Jensen, H. W., and Christensen, P. H. 1998. Efficient simulation of light transport in scenes with participating media using photon mapes. In *Proc. of SIGGRAPH '98*.

Jensen, H. W., Marschner, S. R., Levoy, M., and Hanrahan, P. 2001. A practical model for subsurface light transport. In *Proc. of SIGGRAPH '01*.

Kajiya, J. T. 1986. The rendering equation. In *Computer Graphics (Proc. of SIGGRAPH)*.

Kienle, A., and Patterson, M. S. 1997. Improved solutions of the steady-state and the time-resolved diffusion equations for reflectance from a semi-infinite turbid medium. *J. Opt. Soc. Am. A* 14, 1, 246-254.

Knaus, C., and Zwicker, M. 2011. Progressive photon mapping: A probabilistic approach. *ACM Transactions on Graphics* 30, 3.

Kulla, C., and Fajardo, M. 2012. Importance sampling techniques for path tracing in participating media. *Computer Graphics Forum (Proc. of Eurographics Symposium on Rendering)* 31, 4 (June), 1519-1528.

Lafortune, E. P., and Willems, Y. D. 1993. Bi-directional path tracing. In *Compugraphics '93*.

Lafortune, E. P., and Willems, Y. D. 1996. Rendering participating media with bidirectional path tracing. In *Proceedings of the eurographics workshop on Rendering techniques*.

Li, H., Pellacini, F., and Torrance, K. E. 2005. A hybrid monte carlo method for accurate and efficient subsurface scattering. In *Rendering Techniques 2005: 16th Eurographics Workshop on Rendering*, 283-290.

Novák, J., Nowrouzezahrai, D., Dachsbacher, C., and Jarosz, W. 2012. Virtual ray lights for rendering scenes with participating media. *ACM Transactions on Graphics (Proc. SIGGRAPH)* 31, 4 (July).

Pauly, M., Kollig, T., and Keller, A. 2000. Metropolis light transport for participating media. In *Proc. of Eurographics Workshop on Rendering*.

Veach, E., and Guibas, L. 1994. Bidirectional estimators for light transport. In *Proc. of Eurographics Rendering Workshop*.

\* cited by examiner

PHOTON BEAM DIFFUSION

CROSS-REFERENCES TO RELATED APPLICATIONS

This application claims the benefit of and is a non-provisional of U.S. Provisional Application No. 61/754,499 entitled "Photon Beam Diffusion For Rendering Translucent Materials" filed on Jan. 18, 2013, which is incorporated by reference in its entirety for all purposes.

BACKGROUND

The present disclosure generally relates to computer animation, and more particularly to simulation of light on an object for rendering an animated scene.

In computer graphics, some desired effects are created by modeling light and its interactions with objects present in a virtual space. A geometric model describing lighting, objects, effects, etc. positioned in the virtual space is provided to a renderer. The renderer processes the geometric model to provide images, e.g., two-dimensional images of what might be viewed from a camera within the virtual space.

In some rendering, it is sufficient to model every object as being a solid, opaque object, wherein light reflects or diffuses off just the surface of the object. However, for some additional realism, it is often desirable to model light diffusing through at least a part of the subsurface of an object or to deal with representations of translucent materials, such as skin, paper, wax, fluids or other examples.

Rendering translucent materials efficiently in computer graphics is a major challenge and requires specialized methods. The light transport inside a scattering medium can be described by a Bidirectional Surface Scattering Reflectance Distribution Function (BSSRDF), which defines how light scatters from an entry point on the surface of an object of scattering material to an exit point of on the surface of the object. Due to the non-localized scattering inside the medium, the BSSRDF is higher dimensional than a Bidirectional Reflectance Distribution Function (BRDF). Due to the many scattering events of light inside the scattering medium, the computational resources to evaluate the solution exactly are enormous, and approximations are applied to render translucent media.

A brute-force but fully correct method to calculate subsurface scattering is to apply volumetric path tracing. But due to the nature of scattering, a huge number of paths have to be calculated to achieve a correct and noise-free result. Alternatively, many approximation methods model light transport as a diffusion process, which can be interpreted as an approximation for a large number of scattering events. However, current techniques are computationally time consuming, make limiting assumptions about the material, and have difficulty dealing with non-normal incident beams.

Therefore, it is desirable to provide new techniques for simulating the effects of light on a surface of a translucent object.

BRIEF SUMMARY

An embodiment is of a method of image processing, in which a computer generates an image of a geometric model of an object comprising a translucent material. The method includes identifying an illumination source and light beams that it produces. The boundary of the object and physical parameters related to light scattering are determined. Locations on the boundary are identified at which a radiant exitance value is to be calculated. For each beam an intersection point with the boundary is found, and a selection of points along the beam's ray internal to the object is made using importance sampling according to a probability distribution function. At each of the points along the ray a function giving a radiant value is calculated, using the physical parameters as well. A sum of the radiant values weighted by the corresponding probability distribution function values is calculated to give the contribution of the beam to the radiant exitance value.

In various embodiments, the probability density function may be exponentially decreasing with distance along the beam in the translucent material, or may be uniform with respect to the angular domain subtended by the beam, the angular domain being measured with respect to the location on the boundary. Other probability distributions may be used, as known to one of ordinary skill in the art.

Other embodiments disclose systems comprising processors and memory configured to implement methods of generating an image of a translucent object. Other embodiments disclose a computer product comprising a non-transitory computer-readable medium storing code that causes one or more processors of a computer to implement methods of generating an image of a translucent object.

DEFINITIONS

Figure 1A:
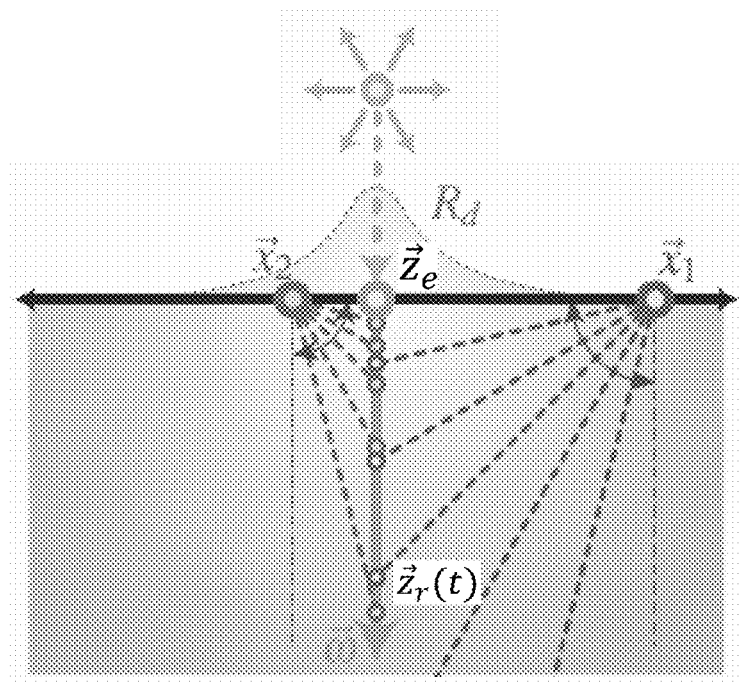
FIG. 1A and FIG. 1B illustrate typical paths of light rays within a semi-infinite translucent material.

Transparent materials are those which allow light to pass through without scattering, though there may be partial reflection of at the surface of a transparent object. Water and glass are examples. Opaque materials do not allow light to enter beyond the surface; the light is either reflected or absorbed at the surface. Translucent materials behave very differently from either transparent or opaque materials, since light may enter and be scattered internally or be partially absorbed internally. Because of internal scattering, it is possible for photons to enter at one point of the material and exit at another. Because of the scattering interaction of the material with impinging light, the term participating media is also used.

As convenience, a non-exhaustive list of acronyms used herein is provided. The detailed meaning of each acronym or term is given in subsequent paragraphs.

BSDF Bidirectional Scattering Distribution Function
BSSRDF Bidirectional Surface Scattering Reflectance Distribution Function
Lerp Linear Interpolation
MC Monte Carlo
PBD Photon Beam Diffusion
PD Photon Diffusion
RTE Radiance Transport Equation
QD Quantized Diffusion
VRL Virtual Ray Light Table 1 lists notation used throughout this paper.

TABLE 1

Notation used.

| Symbol | Description | Units |
| --- | --- | --- |
| $L(\vec{x}, \vec{\omega})$ | Radiance | [W m$^{-2}$ sr$^{-1}$] |
| $f_s(\vec{\omega}, \vec{\omega})$ | Phase function (normalized to $1/4\pi$) | [sr$^{-1}$] |
| g | average cosine of scattering | — |
| $\sigma_s$ | Scattering coefficient | [m$^{-1}$] |
| $\sigma_s'$ | Reduced scattering coefficient: $(1 - g)\sigma_s$ | [m$^{-1}$] |
| $\sigma_a$ | Absorption coefficient | [m$^{-1}$] |
| $\sigma_t$ | Extinction coefficient: $\sigma_s + \sigma_a$ | [m$^{-1}$] |
| $\sigma_t'$ | Reduced extinction coefficient: $\sigma_s' + \sigma_a$ | [m$^{-1}$] |
| H | Relative index of refraction | — |
| l | Mean-free path: $1/\sigma_t$ | m |
| l' | Reduced mean-free path: $1/\sigma_t'$ | m |
| α | Scattering albedo: $\sigma_s + \sigma_t$ | — |
| α' | Reduced scattering albedo: $\sigma_s'/\sigma_t'$ | — |
| $\emptyset(\vec{x})$ | Fluence | [Wm$^{-2}$] |
| $\vec{E}(\vec{x})$ | Vector flux (vector irradiance) | [W m$^{-2}$] |
| $Q(\vec{x})$ | Source function | [W m$^{-3}$] |
| D | Diffusion coefficient | [m] |
| $\sigma_{tr}$ | Transport coefficient: $\sqrt{\sigma_a/D}$ | [m$^{-2}$] |

DETAILED DESCRIPTION

In many computer processes of generating an image of an animated scene, a geometric model of the scene is first created virtually within a computer system. The geometric model may comprise representations of objects within the scene, including illumination sources. The geometric model may include a variety of physical objects, with respective physical parameters included as part of the geometric model. The geometric model may include mathematical representations of the physical objects. An example of such a representation is an array of mesh points located on the surface of the object. An example would be a representation of a glass and a teapot on a table, illuminated by a source behind, but not directly behind, the viewpoint. The material properties of the physical objects may vary considerably. In the example, the glass would be transparent (or have only a limited surface reflection), the teapot material could be translucent, and the tabletop could be completely reflective. The different physical properties of the objects' materials affect the color and lighting of the objects, as seen from the viewpoint.

To better understand the disclosures presented herein, an overview is first given of the physics underlying light scattering in translucent material. Then, methods for determining radiant exitance values on a surface of an object are described. Embodiments can provide a hybrid method for photon beam diffusion that combines Monte Carlo and diffusion approximation. For example, a radiant exitance value from an internal beam can be determined as a weighted sum of radiant values of a function at sample points along an internal beam.

The same improved subsurface scattering results as quantized diffusion can be obtained, while being simpler, faster, and numerically stable. Embodiments can be used with point-based and ray-traced subsurface scattering, with comparable efficiency as a classic dipole diffusion model. Validation has been done in both research and production renderers. Embodiments can be applied to more general integration methods such photon beams, minimizing artifacts associated with strongly oblique angles. In one embodiment, an empirical correction factor can be used to improve the accuracy for near source and oblique illumination regions compared to quantized diffusion (QD).

I. Introduction

Shown in FIG. 1A is a light from a source normally incident on a semi-infinite slab of translucent material. A particular beam of light is shown entering the material at point $\vec{z}_e$. As the angle of incidence is normal, there is no angle of refraction, and the beam inside along the unit vector $\vec{\omega}$ is collinear with the beam incident on the material. Shown along $\vec{\omega}$ are radiant source points $\vec{z}_r(t)$, where t is the distance along the beam.

Also shown in FIG. 1A are two points, $\vec{x}_1$ and $\vec{x}_2$ at which light that travels along $\vec{\omega}$ may be scattered and exit. In the case shown, the light undergoes one scattering. Also shown is a profile of an radiant exitance function $R_d$. Because of the normal incidence of the light beam, the profile of $R_d$ is symmetric in $\vec{x}$ about $\vec{z}_e$. Embodiments can use properties of certain scattered light rays from $\vec{\omega}$ to $\vec{x}_1$ and $\vec{x}_2$ to determine a radiant exitance values at these points.

Figure 1B:
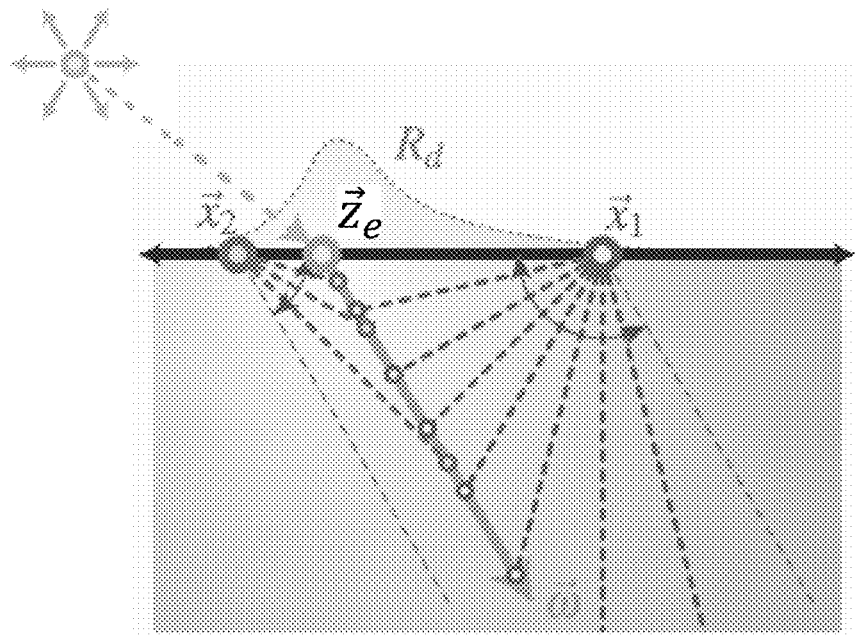

Shown in FIG. 1B is an analogous situation, only with the beam of light striking the material at an oblique angle. In this case there is refraction of the beam of light in the material, so $\vec{\omega}$ is not collinear with the incident beam. Also, the source points along $\vec{\omega}$ increase in distance more rapidly away from $\vec{x}_2$, leading to an asymmetric profile for $R_d$ about $\vec{z}_e$. Again, embodiments can use properties of certain scattered light rays from $\vec{\omega}$ to $\vec{x}_1$ and $\vec{x}_2$ to determine a radiant exitance values at these points in FIG. 1B.

Figure 2A:
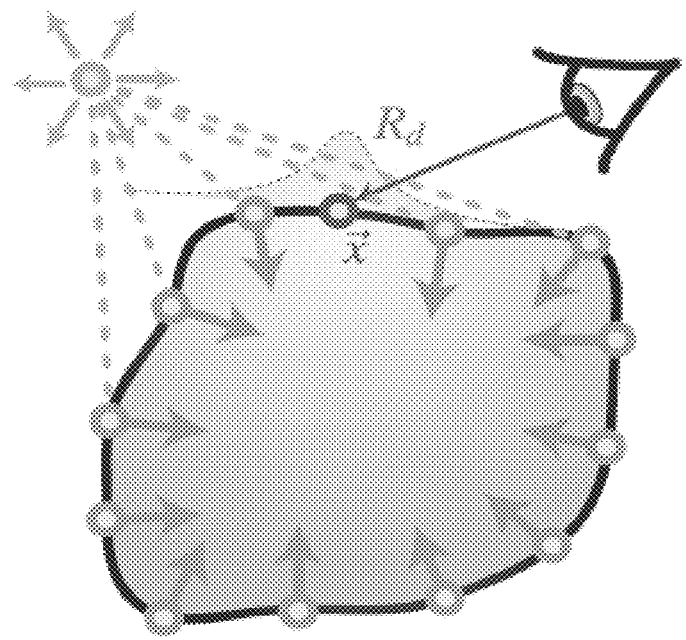
FIG. 2A and FIG. 2B illustrate light diffusion in a compact translucent object.

FIG. 2A illustrates a more realistic, compact object containing translucent material. Shown is a light source and various beams, and the respective internal refracted beams. The light observed by the indicated human eye, or by a camera similarly located and oriented, depends on the radiant exitance $R_d$ about $\vec{x}$ In the example of FIG. 2A, the beams are shown hitting the surface and then penetrating the surface and traveling perpendicular to the surface. Some embodiments can make this approximation, depending on the index of refraction and the direction of the incident light, so that the profile of $R_d$ about $\vec{x}$ in FIG. 2A is approximately symmetric in this special case.

Figure 2B:
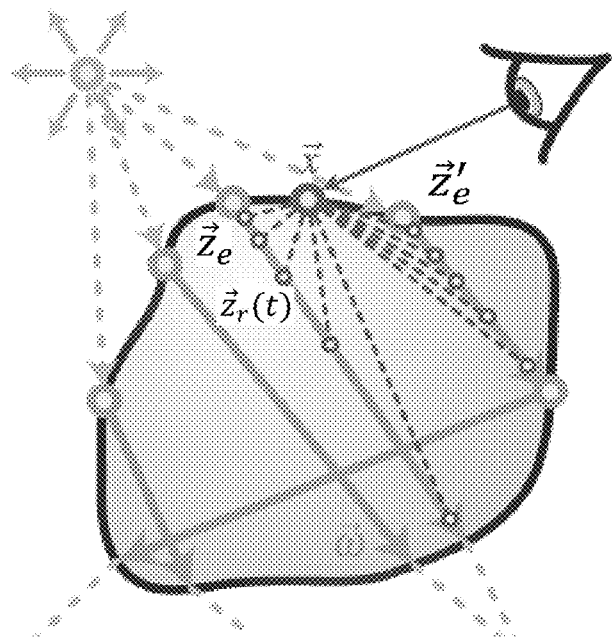

FIG. 2B shows the same object as in FIG. 2A but with internal beams extended to illustrate the source points along two beams that contribute to $R_d$ at $\vec{x}$. In this example, the internal beams are more realistic and deviate from being perpendicular to the surface. As one can see, the radiant exitance value at the surface point $\vec{x}$ receives contributions from multiple internal beams.

Figure 3A:
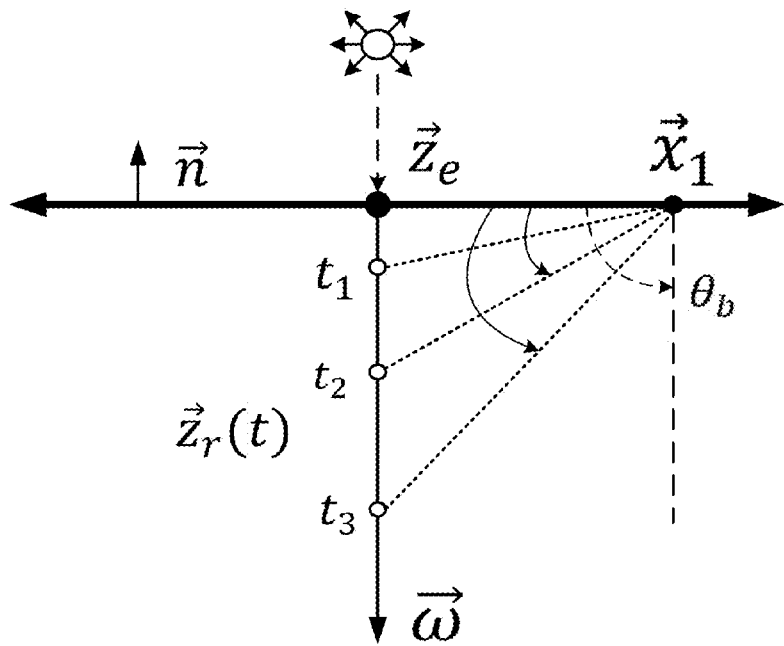
FIG. 3A and FIG. 3B illustrate light diffusion in a translucent material, under normal and oblique incidence to a planar surface.
Figure 3B:
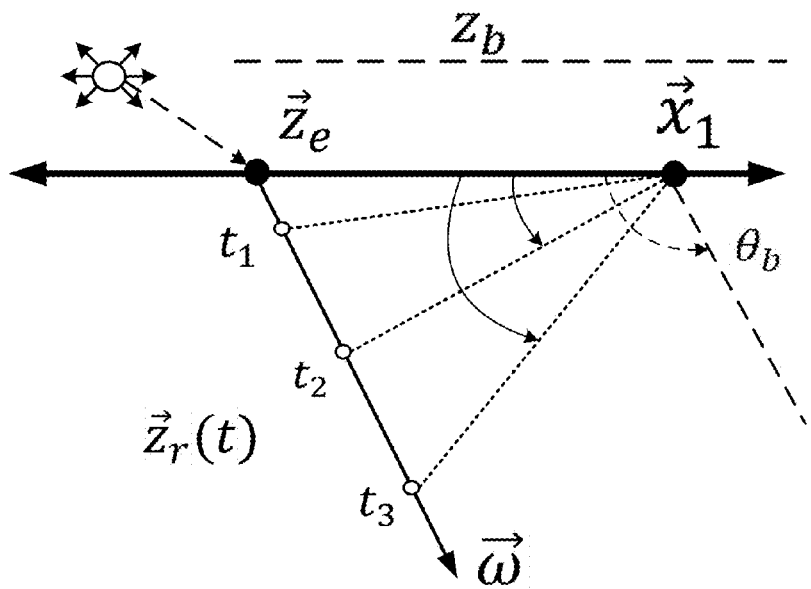

FIG. 3A and FIG. 3B show geometric simplifications of the geometry of FIG. 2A and FIG. 2B. In FIG. 3A and FIG. 3B the object is idealized as an semi-infinite medium, separated by a half-plane. The unit outward normal $\vec{n}$ to the plane is shown in FIG. 3A. A mirror image plane is indicated in FIG. 3B by $z_b$, and will be explained more fully in the analysis that follows.

Using these references an analysis of light scattering inside a translucent material is now presented.

A. Light Transport Theory

Light transport in a participating medium can be described by the radiance transport equation (RTE):

$$(\vec{w} \cdot \vec{\nabla}) L(\vec{x}, \vec{w}) = -\sigma_t L(\vec{x}, \vec{w}) + Q(\vec{x}, \vec{w}) + \sigma_s \int_{4\pi} L(\vec{x}, \vec{w}')$$
$$f_s(\vec{w}, \vec{w}') d\vec{w}', \quad (1)$$

which states that the change in radiance L in direction $\vec{w}$ is the sum of three terms: a decrease in radiance dictated by the extinction coefficient ($\sigma_t = \sigma_s + \sigma_a$), an increase due to the source function Q, and the in-scattering on the second line. The notation is summarized in Table 1.

Rendering participating media in graphics requires solving differential equation (1), at least in some approximate form, with suitable boundary conditions. Some known general methods make use of path tracing or photon mapping, but are slow to converge. Other methods make use of a diffusion approximation and are more efficient when the assumptions of the methods about the media are acceptable.

B. Classical Diffusion Theory

The classical diffusion approximation solves Equation (1) by considering only a first-order spherical harmonic expansion of the radiance:

$$L(\vec{x}, \vec{w}) \approx \frac{1}{4\pi} \phi(\vec{x}) + \frac{3}{4\pi} \vec{E}(\vec{x}) \cdot \vec{w}, \quad (2)$$

where the fluence $\phi$ and vector flux $\vec{E}$ are the first two moments of the radiance distribution:

$$\phi(\vec{x}) = \int_{4\pi} L(\vec{x}, \vec{w}) d\vec{w}, \quad \vec{E}(\vec{x}) = \int_{4\pi} L(\vec{x}, \vec{w}) \vec{w} \, d\vec{w}. \quad (3)$$

If it is further assumed that the source function is isotropic, i.e. $Q(\vec{x}, \vec{w}) = Q(\vec{x})$, the classical diffusion equation follows from this approximation:

$$-D \nabla^2 \phi(\vec{x}) + \sigma_a \phi(\vec{x}) = Q(\vec{x}), \quad (4)$$

where $$D = \frac{1}{3\sigma_t'}$$

is the diffusion coefficient and $\sigma_t'$ is the reduced extinction coefficient.

In the case of a unit power isotropic point source in an infinite homogeneous medium, the solution to Equation (4) is the diffusion Green's function for a monopole:

$$\phi(\vec{x}) = \frac{1}{4\pi D} \frac{e^{-\sigma_{tr} d(\vec{x})}}{d(\vec{x})}, \quad (5)$$

where $\sigma_{tr} = \sqrt{\sigma_a/D}$ is the transport coefficient and $d(\vec{x})$ is the distance from $\vec{x}$ to the point source.

To render sub-surface scattering, a suitable source function $Q(\vec{x}, \vec{w})$ in Equation (1) needs to be defined. In reality, each ray of light incident on a smooth surface gives rise to a refracted ray within the medium with exponentially-decreasing intensity. To avoid integrating from the extended beam source, Farrell et al. [1992] proposed concentrating all the light at a single point, placed at a depth of one mean-free-path ($1/\sigma_t'$) inside the medium. This approximation was also employed by Jensen et al. [2001].

Applying diffusion theory to a medium with boundaries requires appropriate boundary conditions. For semi-infinite configurations as shown in FIG. 3A and FIG. 3B, the boundary condition can be handled in an approximate fashion by placing a mirrored negative image source, also called a virtual source, outside the medium for every positive source inside the medium. The mirroring is performed above an extrapolated boundary plane such that the fluence is zero at a distance $z_b = 2AD$ above the surface. This offset from the physical boundary takes into account the relative index of refraction mismatch at the boundary. A is the reflection parameter indicating the amount of diffuse light reflected from a Fresnel interface. Jensen et al. approximated A as:

$$A(\eta) = \frac{1 + F_{dr}(\eta)}{1 - F_{dr}(\eta)} \quad (6)$$

where $\eta$ is the relative index of refraction of the boundary and $F_{dr}$ is the average diffuse Fresnel reflectance.

With these boundary conditions, the fluence due to a single isotropic point source within a semi-infinite medium is simply the sum of two monopoles from Equation (5):

$$\phi(\vec{x}) = \frac{1}{4\pi D} \left( \frac{e^{-\sigma_{tr} d_r(\vec{x})}}{d_r(\vec{x})} - \frac{e^{-\sigma_{tr} d_v(\vec{x})}}{d_v(\vec{x})} \right) \quad (7)$$

where $d_r = \|\vec{x} - \vec{z}_r\|$ is the distance from $\vec{x}$ to the real source at $\vec{z}_r$, and $d_v = \|\vec{x} - \vec{z}_v\| = \|\vec{x} - (\vec{z}_r + 2z_b \vec{n})\|$ is the distance to the virtual source at $\vec{z}_v$, mirrored at the extrapolated boundary $z_b$. The standard dipole places the real source at a distance $z_r = 1/\sigma_t'$, or one mean-free-path, directly below the surface, regardless of the incident direction of the light.

The equations so far have expressed the fluence volumetrically within the medium. To render surfaces, it may necessary to compute the radiant exitance at the surface. To handle this, Jensen et al. [2001] used Fick's law which states that (in the presence of isotropic sources) the vector flux is the gradient of the scalar fluence:

$$\vec{E}(\vec{x}) = -D \vec{\nabla} \phi(\vec{x}). \quad (8)$$

Since the radiant exitance on the boundary is the inner-product of the vector flux with the surface normal, we have:

$$R_d(\vec{x}) = \vec{E}(\vec{x}) \cdot \vec{n} = -D(\vec{\nabla} \cdot \vec{n}) \phi(\vec{x}). \quad (9)$$

Hence, to compute the diffusion profile $R_d$ due to a dipole, we need to evaluate the directional derivative ($\vec{\nabla} \cdot \vec{n}$) of the fluence (7) in the direction of the normal, which gives us:

$$R_d(\vec{x}) = \frac{\alpha'}{4\pi}\left[\frac{z_r(1+\sigma_{tr}d_r)e^{-\sigma_{tr}d_r}}{d_r(\vec{x})^3} + \frac{z_v(1+\sigma_{tr}d_v)e^{-\sigma_{tr}d_v}}{d_v(\vec{x})^3}\right], \quad (10)$$

where some of the variable's arguments are omitted for brevity. Because the classical dipole uses a single dipole, all scattering events are placed at the position of the positive source inside the medium which leads to inaccuracies in the diffusion profile near the light source.

Note that Equation (10) for the radiant exitance has assumed a semi-infinite (planar surface) domain, with isotropic media and a classical dipole as a single scattering source. While these assumptions may not apply in all cases, they can serve as the basis for the following improved analysis.

C. Modified Diffusion Theory d'Eon and Irving [2011] introduced the following changes to the classical diffusion theory just described: (a) using a modified diffusion equation which decouples single and multiple scattering, (b) using an extended source function, (c) using a more accurate calculation for the reflection parameter A in the boundary conditions, and (d) using a more accurate radiant exitance calculation. In addition to this, d'Eon and Irving proposed a method to integrate the extended-source function by quantizing time, which results in a sum-of-Gaussians solution for the diffusion profile. These changes are now summarized.

Instead of the formula for the fluence given in (5), Grosjean [1956; 1959] proposed a different, closed-form approximation for the fluence due to an isotropic point source (monopole) in an infinite medium:

$$\phi(\vec{x}) = \frac{e^{-\sigma'_t d(\vec{x})}}{4\pi d^2(\vec{x})} + \frac{\alpha'}{4\pi D_g}\frac{e^{-\sqrt{\frac{\sigma_a}{D_g}}d(\vec{x})}}{d(\vec{x})}, \quad (11)$$

where $d$ is the distance between $\vec{z}$ and the point source, the first term is the exact single-scattering and the second term is the Green's function for multiple scattering. The modified diffusion coefficient is $$D_g = \frac{2\sigma_a + \sigma'_s}{3\sigma'^2_t}. \quad (12)$$

Grosjean's approximation gives rise to a modified diffusion equation:

$$-D_g \nabla^2 \phi(\vec{x}) + \sigma_a \phi(\vec{x}) = \alpha' Q(\vec{x}). \quad (13)$$

Compared to Equation (4), this diffusion equation uses a modified diffusion coefficient (12) and multiplies the source term by the reduced albedo $\alpha'$. This effectively decouples the single scattered light and the multiply-scattered light, which provides more accurate solutions, especially near the source and for low albedos. The Green's function of this modified diffusion equation is the second term of Equation (11) which has the same form as the diffusion Green's function (5) but differing coefficients.

As for boundary conditions, d'Eon and Irving still use the same boundary condition where the fluence is forced to be zero at a distance $z_b = 2AD$ above the surface; however, they use the Grosjean diffusion coefficient (13) and, instead of Equation (6), they use the following improved approximation for A:

$$A(\eta) = \frac{1 + 3C_2(\eta)}{1 - 2C_1(\eta)} \quad (14)$$

where $C_i$ is the $i^{th}$ angular moment of the Fresnel reflectance $F_r$.

With these changes, the dipole can be expressed nearly identically to Equation (7); however, it only represents the multiply-scattered fluence:

$$\phi(\vec{x}, \vec{z}_r) = \frac{\alpha'}{4\pi D}\left(\frac{e^{-\sqrt{\frac{\sigma_a}{D_g}}d_r(\vec{x},\vec{z}_r)}}{d_r(\vec{x},\vec{z}_r)} - \frac{e^{-\sqrt{\frac{\sigma_a}{D_g}}d_v(\vec{x},\vec{z}_r)}}{d_v(\vec{x},\vec{z}_r)}\right). \quad (15)$$

For clarity of further derivations, the explicit dependence of the position of the real source $\vec{z}_r$, which is a constant for the dipole, has been added.

To account for an entire beam of photons entering and propagating inside the medium, one defines an extended source along the (refracted) beam, with an exponential power falloff formed by all first-scatter events inside the medium [Farrell et al. 1992]:

$$Q(\vec{z}) = \alpha'\sigma_t' e^{-\sigma_t'\|\vec{z}\|}, \quad (16)$$

where $\vec{z}$ is the location along the beam direction inside the medium. Let $\vec{z}_r(t) = t\vec{\omega}$ be a parameterization of the beam, where $\vec{\omega}$ is a unit vector in the beam direction into the medium.

As for radiant exitance, instead of using Fick's Law, which relies solely on vector flux, d'Eon and Irving use an approach proposed by Kienle and Patterson [1997] which uses a first order expansion of radiance involving both the scalar fluence and the vector flux. This results in a more accurate radiant exitance defined as:

$$R_d(\vec{x}) = C_\phi \phi(\vec{x}) + C_{\vec{E}}(-D_g(\vec{\nabla} \cdot \vec{n})\phi(\vec{x})), \quad (17)$$

where $C_\phi = \frac{1}{4}(1 - 2C_1)$ and $C_{\vec{E}} = -\frac{1}{2}(1 - 3C_2)$.

Regarding radiant exitance from an extended source, the fluence $\phi^E$ due to an extended source can be obtained by sweeping the Green's function in Equation (15) along Equation (16):

$$\phi^E(\vec{x}, \vec{\omega}) = \int_0^\infty \phi(\vec{x}, t\vec{\omega})Q(t\vec{\omega})dt, \quad (18)$$

where $\phi(\vec{x}, \vec{z})$ is the dipole Green's functions in Equation (15) with the previously constant position of the real source $\vec{z}_r$ now varying along the extended source.

To obtain the radiant exitance on the boundary, one needs to integrate Equation (17) over the extended source, which results in an integral of the form:

$$R_d(\vec{x}) = \int_0^\infty r(\vec{x}, t\vec{\omega})Q(t\vec{\omega})dt, \quad (19)$$

where $r(\vec{x}, \vec{z}) = r_1(\vec{x}, \vec{z}) + r_2(\vec{x}, \vec{z})$ with:

$$r_1(\vec{x}, \vec{z}) = C_\phi \frac{\alpha'}{4\pi D_g} \left( \frac{e^{-\sigma_{tr}d_r}}{d_r} - \frac{e^{-\sigma_{tr}d_v}}{d_v} \right) \qquad (20)$$

$$r_2(\vec{x}, \vec{z}) = C_{\vec{E}} \frac{\alpha'}{4\pi} \left[ \frac{z(1+\sigma_{tr}d_r)e^{-\sigma_{tr}d_r}}{d_r^3} + \frac{(z+2z_b)(1+\sigma_{tr}d_v)e^{-\sigma_{tr}d_r}}{d_v^3} \right], \qquad (21)$$

using the modified transport coefficient $\sigma_{tr} = \sqrt{\sigma_a/D_g}$ and using the shorthand $d_r = d_r(\vec{x}, \vec{z})$ for the distance between $\vec{x}$ and the real source at $\vec{z}$, and $d_v = d_v(\vec{x}, \vec{z})$ for the distance between $\vec{x}$ and the virtual (mirrored) source determined by $\vec{z}$. In (21), z is the z-component of the vector $\vec{z}$, which is given by $t\vec{\omega} \cdot \vec{n}$ and represents the depth of the real source in the medium.

D. Quantized Diffusion

D'Eon and Irving noted that Equation (19) has no closed-form solution, and proposed to approximate it using a sum-of-Gaussians:

$$R_d(r) \approx \alpha' \Sigma_{i=0}^{k-1} (w_R(i) w_i) G_{2D}(v_i, r) \qquad (22)$$

where $(w_R(i) w_i)$ are the weights, and $v_i$ are the variances of normalized 2D Gaussians $G_{2D}$.

This is similar in principle to d'Eon et al.'s [2007] method, however, instead of obtaining the Gaussian parameters using a non-linear optimization procedure, d'Eon and Irving exploited the fact that time-resolved (or "quantized") diffusion automatically results in a Gaussian distribution of photons. They used this as a physically-justified approach for obtaining the Gaussians without the need for fitting. The equations necessary to obtain the weights and variances of the Gaussians are complex, but should be apparent to the reader.

Unfortunately, there are several practical downsides of solving Equation (19) in this manner. The quantization procedure is non-trivial, relatively expensive, and prone to implementation error. More importantly, the formulas provided in the paper are also highly susceptible to numerical instabilities, requiring functional approximations for a robust implementation. Moreover, Gaussian functions are actually a poor representation for a typical diffusion profile, and therefore many Gaussians (a fine quantization of time) are needed for an accurate reconstruction. Finally, due to the complexity of the calculations and the need for many Gaussians, a quantized diffusion profile is roughly an order of magnitude more expensive to evaluate than the standard dipole.

II. Integration of Photon Beam Diffusion

Since the integral in Equation (19) has no closed form solution, one embodiment of the present invention computes a numerical approximation by calculating a weighted sum of values of the integrand in (19), denoted here as $f(\vec{x}, t_i)$, using importance sampling:

$$R_d(\vec{x}) \approx \frac{1}{N} \sum_{i=1}^{N} \frac{f(\vec{x}, t_i)}{pdf(t_i | \vec{x})}, \qquad (23)$$

where N is the number of evaluation points used, $t_i$ are distances along the beam and $pdf(t_i | \vec{x})$ is a probability density function (pdf) used in the importance sampling. In some cases $pdf(t_i | \vec{x})$ will depend only on the distance t along the beam, whereas in some embodiments the it will depend on both t and $\vec{x}$.

The numerical integration of (19) by the method in (23) is an alternative to numerical integration techniques such as Newton-Cotes quadrature, Gaussian quadrature, or adaptive quadrature methods. Those standard techniques typically require evaluation at a fairly dense set of points on the interval of integration, which can lead to ten, or even hundreds of evaluations of the integrand. This may produce accurate results, but at great computational cost, and may take more time than would be practical if used for rendering an entire image.

Instead, the integrand is evaluated at only a selection of points on the interval of integration. The selection is made using a pdf chosen for the interval of integration. The choice of pdf may be based on physical properties of the object, or by experimental determination based on the quality of the rendered image.

Methods for evaluating Equation (23) can use a number of importance sampling strategies. In the following, $\xi \in [0,1)$ is a canonical uniform random number.

In one embodiment, the pdf used to place the sample points has an exponentially-decreasing distribution along the incident beam. This has the standard form:

$$t = -\frac{\log(1-\xi)}{-\sigma_t} \qquad (24)$$

with, $$pdf(t) = \sigma_t \exp(-\sigma_t t).$$

In this case the pdf does not depend on exit point $\vec{x}$.

In additional and/or alternative embodiments, the samples are spaced in the angular domain subtended by the incident beam, using the equi-angular sampling method, where $$\theta = lerp(\theta_a, \theta_b, \xi), \qquad (25)$$

$$t = -h \cdot \tan(\theta), \qquad (26)$$

$$pdf(t | \vec{x}) = \frac{\theta}{(\theta_b - \theta_a)(h^2 + t^2)} \qquad (27)$$

where h is the distance between $\vec{x}$ and the ray, and $\theta_a$ and $\theta_b$ are the start and end angles of the integration in the angular domain. Note that in the case of a normal incidence beam in a semi-infinite medium, as shown in FIG. 3A, $\theta_a = 0°$, $\theta_b = 90°$, and $h = \|\vec{x}\|$. As shown in FIG. 3B, for an oblique beam the angle $\theta_b$ may be greater than 90°. FIG. 3A and FIG. 3B illustrate equal angular sectors, so that an angle θ has equal probability of occurring in such sectors. This leads to a distribution of source locations $t_i$ which are more densely located near the entrance of the beam.

In additional and/or alternative embodiments, linearly decreasing angular sampling. We can also distribute sample non-uniformly in the angular domain. For instance, a linearly-decreasing distribution in the angular domain can be attained using:

$$\theta = \theta_b - \theta_b \sqrt{1-\xi}, \qquad (28)$$

$$t = -h \tan(\theta), \qquad (29)$$

$$pdf(t | \vec{x}) = \frac{2h(\theta_b - \theta)\sqrt{1-\xi}}{\theta_b^2 (h^2 + t^2)}, \qquad (30)$$

where, for simplicity, we assumed the lower bound $\theta_a=0°$ in these equations (though this can be easily generalized for arbitrary $\theta_a$).

Depending on the physical properties of the translucent medium, other pdfs may be chosen to better correspond to the physical properties of the object. Non-limiting examples include Gamma and Cauchy distributions when it is acceptable to approximate t as extending to infinity, and Beta distributions when a finite range of t values better represents the physical situation of the object.

Different sampling techniques can be combined. Given two sampling strategies that perform well in different situations, one solution is to use multiple importance sampling to combine the strategies. Using a standard balance heuristic would draw samples from both strategies across the entire $\vec{x}$ domain. This can be both wasteful, and would not guarantee proper asymptotic tail behavior.

Embodiments can use knowledge of which strategy works better in which region (tail vs. peak) to develop a modified MIS weighting heuristic, tailored to the specific problem. An estimator can become:

$$R_d \approx \frac{1}{N} \sum_{i=1}^{N} \frac{f(\vec{x}, \vec{\omega}, t_i) w_{exp}(t_i, x)}{w_{exp}(t_i, x) pdf_{exp}(t_i) + w_{eq}(t_i, x) pdf_{eq}(t_i|\vec{x}, \vec{\omega})} +$$
$$\frac{1}{N} \sum_{j=1}^{N} \frac{f(\vec{x}, \vec{\omega}, t_j) w_{EQ}(t_j, x)}{w_{exp}(t_j, x) pdf_{exp}(t_j) + w_{eq}(t_j, x) pdf_{eq}(t_j|\vec{x}, \vec{\omega})},$$

where $w_{exp}(t_i, x)=\text{clamp}((x-a)=(b-a),0,1)$ and $w_{eq}(t_i, x)=1-w_{exp}(t_i, x)$. This blending strategy dedicates samples entirely to the superior PDF except in a small transition zone ($x \in [a,b]$) where the two strategies are smoothly weighted. In one implementation, the transition zone is centered around one diffuse mean free path, with $a=0.9/\sigma'_t$ and $b=1.1/\sigma'_t$. This approach can provide domain-specific "representativity" for the two strategies.

Figure 3C:
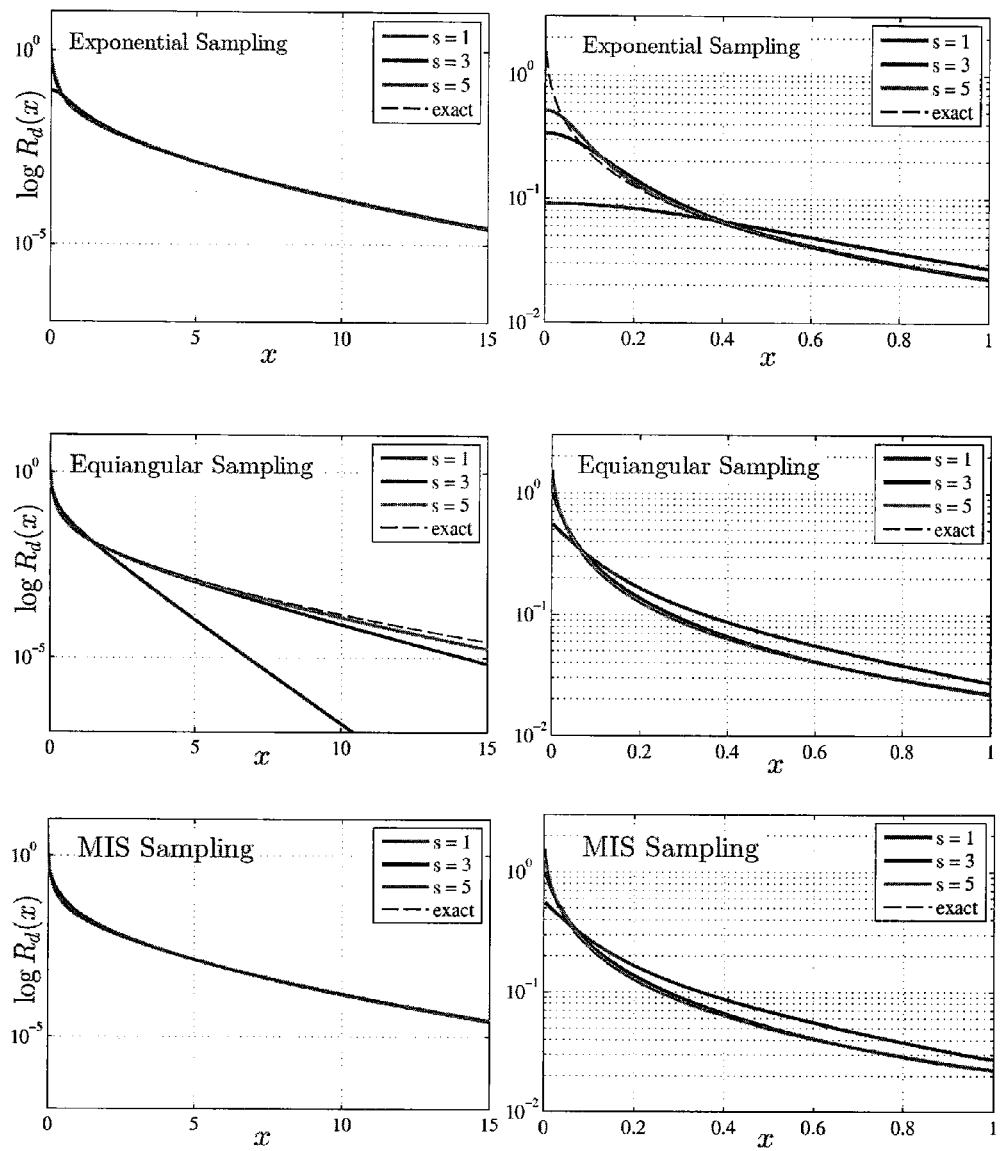
FIG. 3C shows the profiles (left) and close-up of the peak (right) of the two sampling methods for different numbers of samples.

FIG. 3C shows the profiles (left) and close-up of the peak (right) of the two sampling methods for different numbers of samples. Exponential sampling can introduce some smoothing near x=0 while equiangular sampling cannot match the tail behavior. The combined strategy (bottom) matches both. The combined strategy, with just 3 samples, matches the entire profile, including the peak and the asymptotic tail behavior.

In some cases an overestimation of the radiant exitance occurs for near-surface sources. To account for this, one may use a correction factor, $\kappa(\vec{x}, t)=1-e^{-2\sigma_t[d(\vec{x},\vec{z}_r(t))+t]}$, where $\vec{z}_r(t)$ is the location along the beam inside the medium of the evaluation point.

III. Determining Radiant Exitance Values

The analytic understanding and the importance sampling explained above may be used as part of methods for producing computer generated images of scenes comprising translucent objects and illumination sources.

Figure 4:
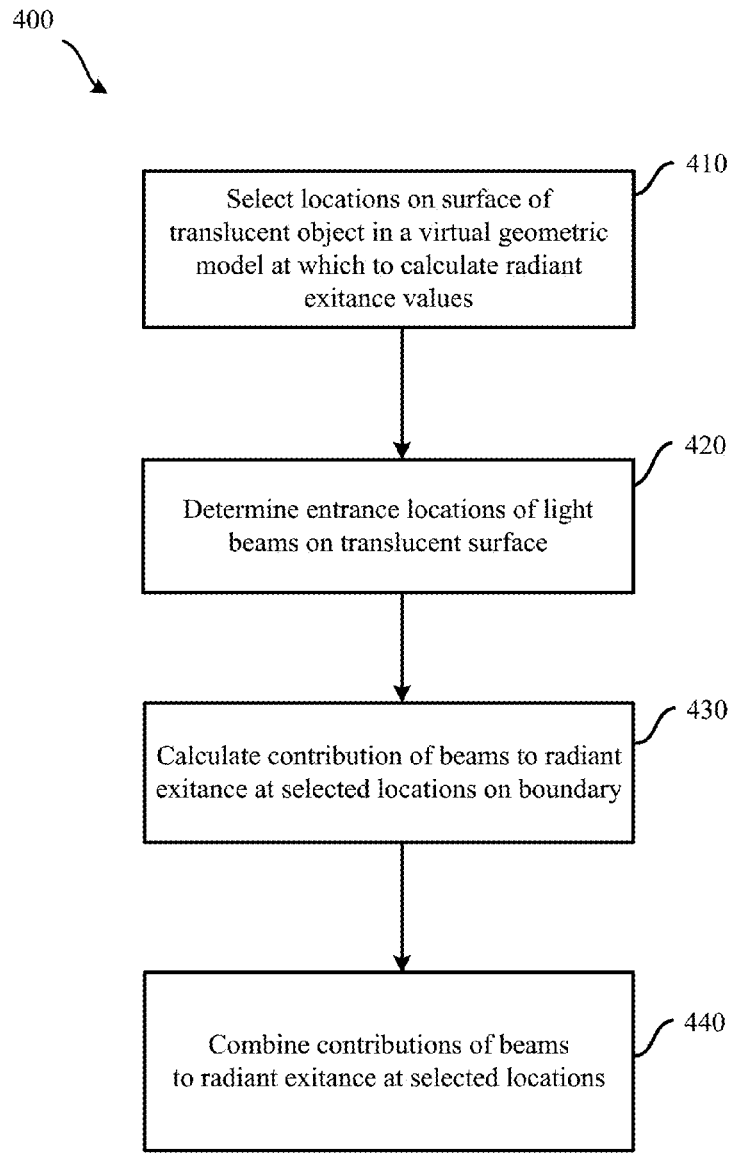
FIG. 4 is a flowchart illustrating a method 400 of determining radiant exitance at points on a surface of a translucent object in a virtual geometric model according to embodiments of the present invention.

FIG. 4 is a flowchart illustrating a method 400 of determining radiant exitance at locations on a surface of a translucent object in a virtual geometric model according to embodiments of the present invention. The value of the radiant exitance may be used by a rendering system to produce a computer-generated image of scene that includes the geometric model. Examples of a rendering system are provided at the end of this description.

In 410, using the virtual geometric model, a selection is made of points on the surface of a translucent object in the virtual geometric model at which to calculate a radiant exitance value. The selection may use criteria such as the visibility of the location from a viewing perspective, the relative location and orientation of an illumination sources within the virtual geometric model, a determination on whether the translucence of the object at the location will be significant for rendering the image of the object, and other criteria as known to one of ordinary skill in the art. As an example, a part of a teapot that is in shadow may be visible but being dimly lit, the translucence of the material may not need to be accounted for, and the image of the shadowed part may be rendered by another method.

The density of the selected locations may be chosen using the extent of the illumination, the computational capability of the computer imaging system, and the availability of other methods for completing the rendering at a totality of locations for the surface. An example of the last criterion is a method of interpolation, as described below.

At 420, the illumination source or sources in the geometric model are used to determine light beams (rays) sufficient to determine the lighting of the object, including sufficient for determining the radiant exitance at the selected boundary locations of the object. In the case of multiple illumination sources, a determination of beams from the separate sources may be combined for use in calculating radiant exitance. The number of beams chosen may depend on the intensity of the illumination source, and the distance of the source from the surface of the object.

The selection of the locations on the surface of the translucent object 410 and the determination of the light beams 420 may be performed in either order, as can other steps in method 400 and other methods described herein. Further, the selection of locations can be dependent on the determination of the illumination sources. For example, a resolution of the locations can depend on how close the object is to the illumination source(s) and depend on how much light is incident on a particular surface of the object. In one embodiment, the locations can have varying resolution on a surface of the object. For example, one location of the surface may have more points per area, then another part of the surface.

Once the determination of beams has been made, the entrance intersections of the beams, if any, with the surface are determined. Also, the angle of incidence of the beam with the surface of the object may be determined. Depending on the properties of the object and the angle incidence, there may or may not be a refracted beam into the object. For example, at incidence angles far from normal, light ray incident on a water surface is reflected without a refracted ray entering the water. Part of the determination of the operation in 420 may be to determine if the beam will contribute to translucence calculation.

At 430, for a selected location on the boundary at which a radiant exitance is to be calculated, a determination is made of which beams may contribute to the radiant exitance at the selected location. This determination may be made on the basis of the intensity of the incident beam, the distance of the intersection of the beam with the surface from the selected location, the beam's angle of incidence at its entrance point (intersection) or other factors. As an example, it may be found that beams entering the object beyond a certain distance from a selected location contribute negligible contributions to a radiant exitance at that location.

Once a determination has been made of the beams to be used in calculating a radiant exitance at a selected surface location. For each such beam, a calculation can be made of the radiant exitance that the beam causes at the location, e.g., using Equation (23). This process uses importance sampling to combine a selected number of radiant values calculated at points along the beam within the object. The points are chosen according to a pdf adapted according to factors including the properties of the material, the direction of the beam in the object, and the computational capabilities available.

At 440, the resulting contributions may be combined to produce a net radiant exitance at the selected location. The combination may be by addition of the radiant exitances calculated for the beams, or by a weighted sum to account for physical effects. In one example each beam's radiant exitance is weighted according to the incident power in the beam, if the effect of the beam's power has not been included in the calculation using Equation (23).

IV. Use of Importance Sampling

Method 400 provided a general method for determining radiant exitance values from multiple light beams. To determine a contribution from a particular light beam, importance sampling can be used to identify points along the internal beam for determining the contribution of the exitance value at a location on the surface. The selected points on the beam and associated weights can be representative of the contributions of all points along the internal beam, thereby allowing an efficient determining of the radiant exitance value at a location on the surface due to the light beam.

Figure 5:
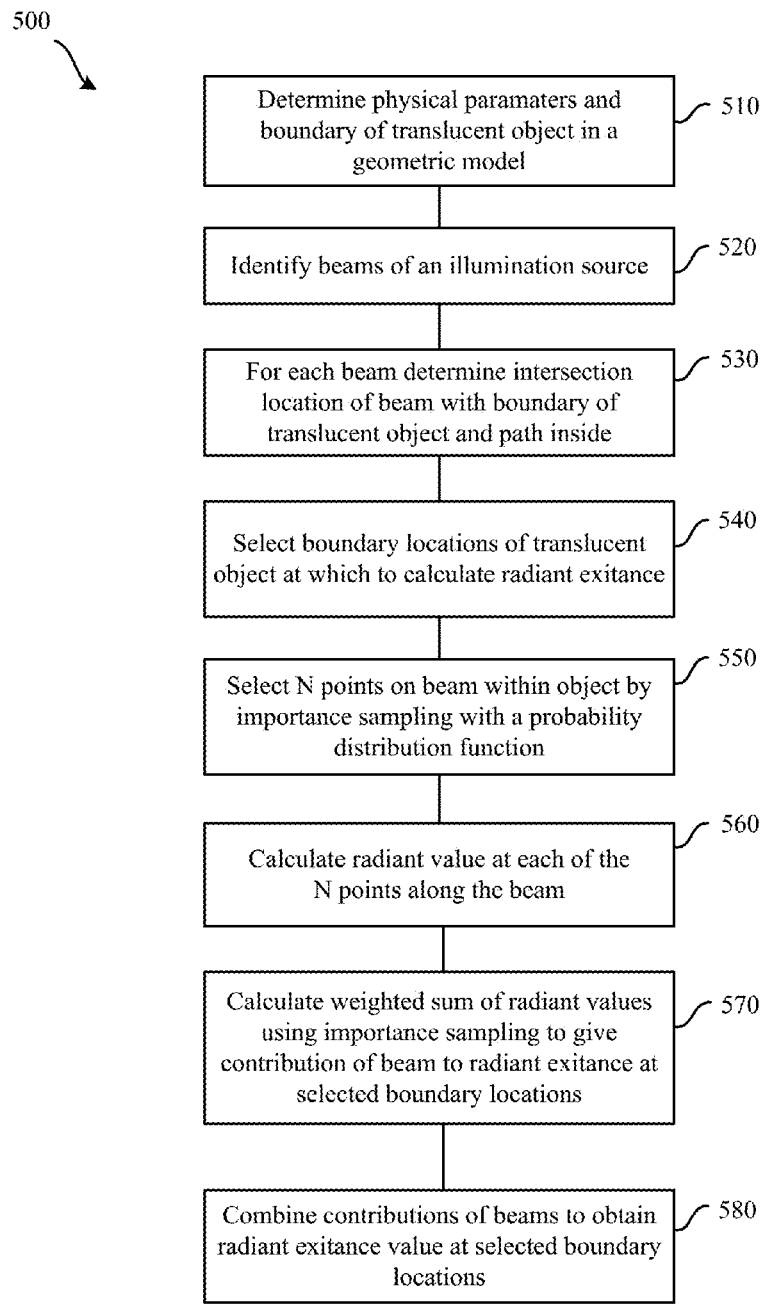
FIG. 5 is a flowchart illustrating a method 500 for determining radiant exitance values at selected locations on a boundary of an object using importance sampling according to embodiments of the present invention.

FIG. 5 is a flowchart illustrating a method 500 for determining radiant exitance values at selected locations on a boundary of an object using importance sampling according to embodiments of the present invention.

At 510, a geometric model of a scene comprising a translucent object is created. The model may be a virtual model within a computing system, and the model may be used for rendering images of the scene. The model may include a wire mesh frame or other representation specifying the boundary of the object, or other 3 dimensional data for locating the object within the scene. The information may include an orientation of a point of view from which an image of the object will rendered. For example, the information may include the distance, tilt, focal distance, or other data regarding a virtual camera viewing the object.

Also, the physical parameters describe the object may be included in the model. Such parameters may include a surface reflectance, index of refraction, information about composition of layers within the object, color information, or other information that may useful for determining the behavior of the object in response to incident light, and for rendering an image of the object based on the response to the incident light.

The model may include one or more light sources which can contribute incident light that an illuminate the object from the point of view from which the image will be rendered. The light sources may be part of the scene, or may be implicitly located at points outside of the scene, but such that light emanating from them may impinge the object. The location of the light sources may also be included in the model. Also, the intensity, color data, and other information may be included.

At 520 beams from the light source or sources are determined. The beams may be modeled as rays within the geometric model. The beams may be chosen based on whether they impinge on the translucent object in the scene to be imaged. Enough beams may be chosen to give a fine enough detail for the lighting. The number necessary to yield a realistic image may also be found by experimentation, and/or based on physical properties such as the intensity of the light source or its color. The direction in the model of the beams from the light sources to the object are also determined.

At 530, for each beam found in 520, the point of intersection of the beam with the translucent object is calculated. Based on the boundary information of the object in the model, the angle of incidence of the beam with the object may also be found. This angle may be used to determine, using the index of refraction and other physical properties of the object and the light beam, whether the beam refracts into the material. Depending on the angle of incidence, the beam of light may be completely reflected. In such a case, other techniques for determining the effect of the light beam on the image may need to be applied.

In the case that the light of the beam does refract into the translucent object, the path of the light beam in the object may be calculated. The length of the beam in the object may be approximated as a finite length depending on the absorption and extinction properties of the material of the object. The length of the refracted beam inside the object may be based on multiples of the mean-free path.

A physical stream of photons entering the object along the beam may experience multiple scattering events before being either absorbed, or exiting the object. Clearly accounting for all possible scattering/absorbing paths, while accurate, would be use considerable computational time and processing resources. Instead, various embodiments use alternatives for determining how light entering the object affects how the object appears. Some embodiments approximate the light behavior inside the object by assuming only a single scattering of a photon along the beam, followed by its exiting the material, with a certain probabilities for the distance along the beam at which the scattering occurs, and/or for the angle at which a photon might scatter with respect to the beam.

At 540, a plurality of locations on the boundary of the object are selected at which to calculate a radiant exitance. The selected locations and the respective radiant exitance values may then be used to render the image of the object near that boundary location. The selection of the number and location of the boundary points may be based on a variety of factors. Non-limiting examples include proximity to the virtual camera of the area of the object where the locations are being selected, computational efficiency based on using locations of the object in the model, and locations where finer detail will be required.

The selection of the locations on the boundary of the object may be performed before the selection of the beams from a light source. In some embodiments, the choice of the light beams may be based on the selection of the locations on the boundary. For example, having chosen a higher density of boundary locations on the object in an area where fine detail is necessary, more beams from a light source may be chosen which impinge in the area.

At 550, the calculation of the radiant exitance at one of the selected boundary locations begins by determining which of the beams to use for the calculation. Depending on the computational resources available and other factors, only a subset of the beams internal to the object may be used in the calculation. For example, beams beyond a certain distance from the boundary location may be excluded if it is known that their contributions to the radiant exitance will be negligible.

For each beam to be used in the calculation of the radiant exitance, the calculation continues by using a chosen pdf to generate N radiant source points along the beam inside the object. The number N may be chosen based on experimentation and comparison to known cases. In some embodiments, using N<6 may suffice to yield substantially accurate values for the radiant exitance. The choice of pdf function may reflect information about the physical properties of the object, or may be based on experimental results. For a chosen N, the pdf is used to generate N points along the beam at which a radiant value, and corresponds to evaluation of the integrand in Equation (19).

At 570, the calculation of the net contribution to the radiant exitance from the scattered light from a beam is found by forming the weighted sum given in Equation (23). The weighting uses the process of importance sampling, in which the weight for a sample value radiant value is multiplied by the reciprocal of the pdf. As an explanatory example only, in a case where the interval of integration was [a, b], the uniform pdf would be 1/(b−a). In this case if the interval was subdivided into N equal length subintervals with left endpoints used for evaluation of the integrand, then Equation (23) would reduce to a simple Riemann sum. By using importance sampling, fewer sample points at which to evaluate the integrand can be used; the sampled integrand values are then given varying weights depending on the likelihood of the sample point.

At 580, the contributions to the radiant exitance of each beam, found by using Equation (23) as just disclosed, are combined. In an embodiment, the combination may be by summing each separate contribution. Other methods of combination may be used, such as a weighted average reflecting the intensity of incident beam.

V. Use of Correction Factor and Selection of Pdf

In some cases when Equation (23) is used, points on the beam near the boundary of the object have been found to give too high a contribution. Instead of performing a separate physical analysis for such points, for ease of implementation a simpler process has been found to give good results. In one embodiment a multiplicative correction factor is combined with the weights for the radiant values calculated the points on the beam.

Figure 6:
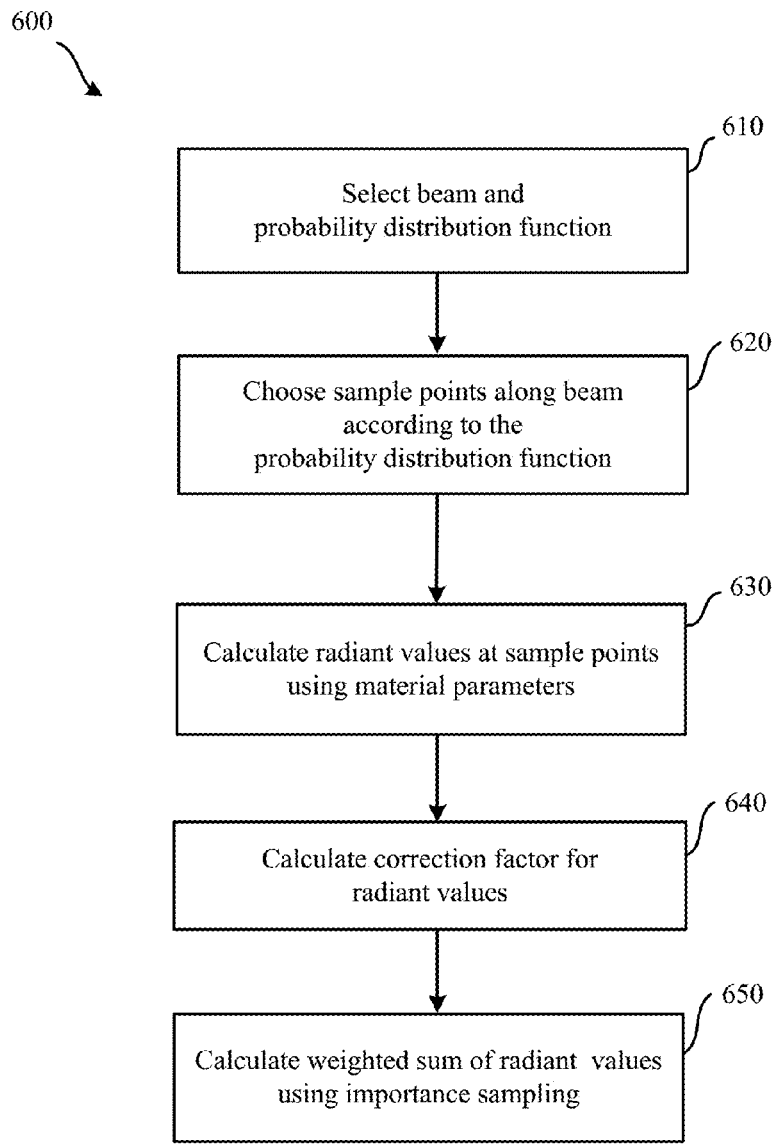
FIG. 6 is a flowchart of a method 600 for determining radiant exitance at a location on a boundary of a translucent object according to embodiments of the present invention.

FIG. 6 is a flowchart of a method 600 for determining radiant exitance at a location on a boundary of a translucent object according to embodiments of the present invention. It presents alternate and/or alternative embodiments of the methods discussed in relation to FIG. 5. The methods illustrated in FIG. 6 assume that operations 510 through 540 have been completed. A radiant exitance is to be calculated at a selected boundary location of the object. Method 600 can be repeated for other boundary locations.

At 610, beams to be used in for calculating the radiant exitance are chosen as disclosed above. For each such beam, a corresponding pdf is chosen. The pdf may be the same for each beam, or may vary depending computational resources, information such as the angle of incidence of the beam, properties of the material, or other factors, as disclosed above.

At 620, sample points to be used as radiant source points are generated on the basis of the chosen pdf, as previously disclosed. The previously cited pdfs of Equation (24) and Equation (27) are two examples. The choice of which pdf to use for a beam may use criteria including the properties of the material of the object and the proximity of the beam entrance point to the location on the surface. In some embodiments, a choice of pdf may be made for each beam, rather than a single choice of pdf for all beams.

In the equiangular strategy, the sample points on the beams depends on the selected boundary location, and more specifically on the distance from the intersection of the beam and the boundary location. For equiangular, when a boundary location is near the intersection, there will be more points on the internal beam near the boundary than far from the boundary. For other distributions (e.g., exponential sampling), the sample points can be at the same points along a beam regardless of where the boundary locations are.

In one embodiment, equiangular sampling is used near the intersection and exponential sampling is used far from the intersection. In one implementation, a cutoff distance can be used to determine which type of sampling to use.

At 630, the integrand of Equation (19) is evaluated to give radiant values at the generated sample points. The methods of evaluation may include those as disclosed above in relation to the process 550. In some embodiments the evaluation is done in parallel to speed processing.

At 640, in some cases using Equation (23) may lead to an overestimation of the contribution to the radiant exitance from near-surface sources. To account for this, one may use a correction factor, $\kappa(\vec{x}, t) = 1 - e^{-2\sigma_t[d(\vec{x}, \vec{z}_r(t)) + t]}$ as a multiplicative weight for each calculated radiant value along the beam, where $\vec{z}_r(t)$ is the location along the beam inside the medium where the radiant value is calculated. Other correction factors may be used to reduce re At 650 the calculation of the radiant exitance value at the boundary location continues as in the process of 570 of FIG. 5. The contribution to the radiant exitance value of each beam is calculated using importance sampling of the corrected radiant values. Thereafter, as the net radiant exitance is calculated, as in the process of 580 of FIG. 5, described above.

VI. Interpolation

Figure 7:
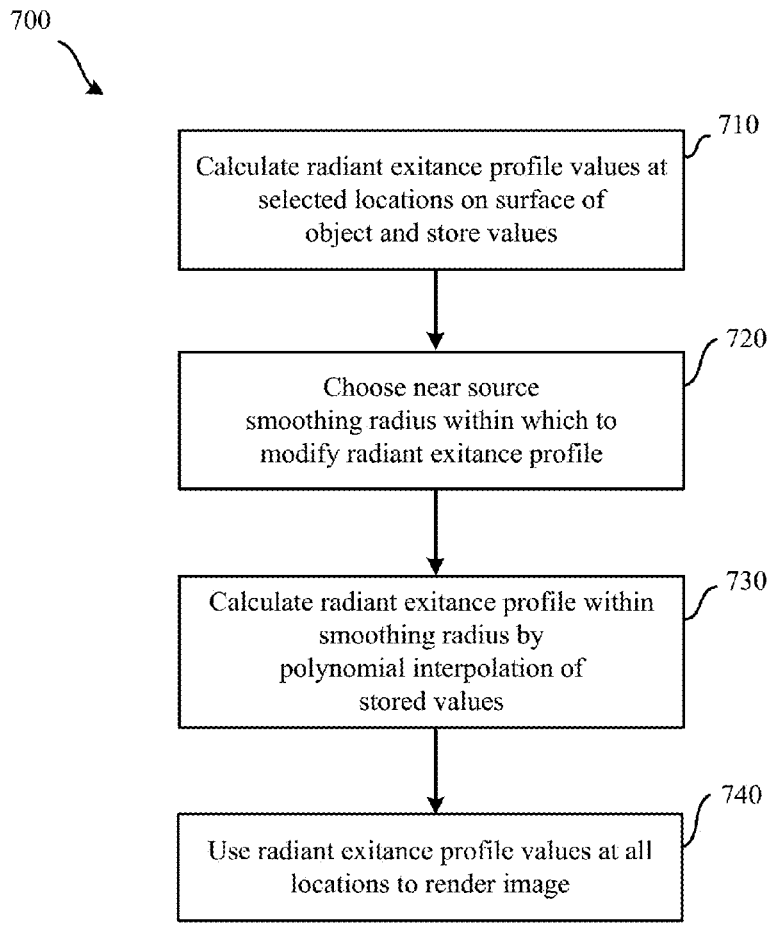
FIG. 7 is a flowchart of a method 700 for determining radiant exitance on a boundary of a translucent object according to embodiments of the present invention

FIG. 7 is a flowchart of a method 700 for determining radiant exitance on a boundary of a translucent object according to embodiments of the present invention. In FIG. 7, it is assumed that a first set of boundary locations of the object have been selected, and a radiant exitance profile has been calculated. In the case that the number of boundary locations in the first set of boundary locations undersamples the radiant exitance on the surface of the object, it may be that the profiles are strongly peaked at the boundary locations, so an acceptable rendering would not be possible.

At 710, the respective radiant exitance profile values at the first set of selected locations are calculated by any of the methods disclosed in relation to FIG. 5 and FIG. 6. These values can be stored in a memory, and retrieved later.

At 720, a near source smoothing radius $x_s$ is chosen. Outside of the radius the calculated and stored profile is maintained. Within the radius $x_s$ a smoothed version of the profile is to be calculated.

In 730, a polynomial interpolation is used so that the profile agrees with the original profile outside the smoothing radius, but is less strongly peaked within the smoothing radius. In one embodiment, a cubic polynomial interpolation is used for the profile within the smoothing radius. Constraints may be used to physical requirements such as conservation of energy are maintained. A first constraint is that the derivative of the profile should be 0 at x=0. Another constraint is that the derivatives of the smoothed profile and the original profile should match at $x_s$. A third constraint is that the total energy over $x \in [0, x_s)$ should be equal.

At 740, once the smoothed profile internal to $x_s$ has been combined to yield a global radiant exitance profile, the global radiant exitance profile is used for rendering. If the smoothing is found to be inadequate, the value of $x_s$ can be changed, or a denser selection of boundary locations can be made and new radiant exitance profile values calculated.

Embodiments can provide for several enhancements. For example, one might account for more general rough dielectric refraction distributions for both multi and single scattering instead of the diffuse distribution, directly incorporating complex BSDFs into the integration process. Some embodiments can only account for anisotropic multiple scattering using similarity theory. Highly forward scattering media such as snow and ice would profit from an accurate incorporation.

VII. Computer Systems

Figure 8:
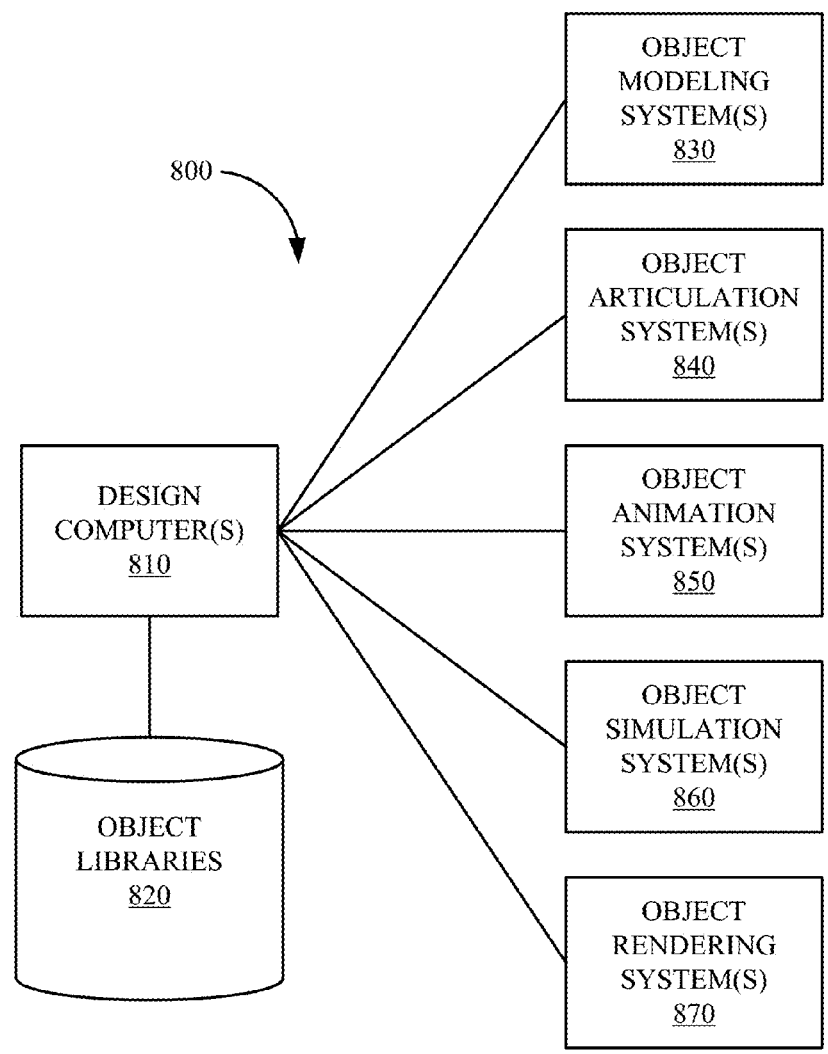
FIG. 8 is a simplified block diagram of a system for creating computer graphics imagery (CGI) and computer-aided animation that may implement or incorporate various embodiments of the present invention.

FIG. 8 is a simplified block diagram of system 800 for creating computer graphics imagery (CGI) and computer-aided animation that may implement or incorporate various embodiments. In this example, system 800 can include one or more design computers 810, object library 820, one or more object modeler systems 830, one or more object articulation systems 840, one or more object animation systems 850, one or more object simulation systems 860, and one or more object rendering systems 870. Any of the systems 830-870 may be invoked by or used directly by a user of the one or more design computers 810 and/or automatically invoked by or used by one or more processes associated with the one or more design computers 810. Any of the elements of system 800 can include hardware and/or software elements configured for specific functions.

The one or more design computers 810 can include hardware and software elements configured for designing CGI and assisting with computer-aided animation. Each of the one or more design computers 810 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 810 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 810 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 810 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 810 acting as an animator may employ one or more systems or tools to specify motion and position of one or more objects over time to produce an animation.

Object library 820 can include elements configured for storing and accessing information related to objects used by the one or more design computers 810 during the various stages of a production process to produce CGI and animation. Some examples of object library 820 can include a file, a database, or other storage devices and mechanisms. Object library 820 may be locally accessible to the one or more design computers 810 or hosted by one or more external computer systems.

Some examples of information stored in object library 820 can include an object itself, metadata, object geometry, object topology, rigging, control data, animation data, animation cues, simulation data, texture data, lighting data, shader code, or the like. An object stored in object library 820 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 830 can include hardware and/or software elements configured for modeling one or more objects. Modeling can include the creating, sculpting, and editing of an object. In various embodiments, the one or more object modeling systems 830 may be configured to generated a model to include a description of the shape of an object. The one or more object modeling systems 830 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 830 may further generate model data (e.g., 2D and 3D model data) for use by other elements of system 800 or that can be stored in object library 820. The one or more object modeling systems 830 may be configured to allow a user to associate additional information, metadata, color, lighting, rigging, controls, or the like, with all or a portion of the generated model data.

The one or more object articulation systems 840 can include hardware and/or software elements configured to articulating one or more computer-generated objects. Articulation can include the building or creation of rigs, the rigging of an object, and the editing of rigging. In various embodiments, the one or more articulation systems 840 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 840 may further generate articulation data (e.g., data associated with controls or animations variables) for use by other elements of system 800 or that can be stored in object library 820. The one or more object articulation systems 840 may be configured to allow a user to associate additional information, metadata, color, lighting, rigging, controls, or the like, with all or a portion of the generated articulation data.

The one or more object animation systems 850 can include hardware and/or software elements configured for animating one or more computer-generated objects. Animation can include the specification of motion and position of an object over time. The one or more object animation systems 850 may be invoked by or used directly by a user of the one or more design computers 810 and/or automatically invoked by or used by one or more processes associated with the one or more design computers 810.

In various embodiments, the one or more animation systems 850 may be configured to enable users to manipulate controls or animation variables or utilized character rigging to specify one or more key frames of animation sequence. The one or more animation systems 850 generate intermediary frames based on the one or more key frames. In some embodiments, the one or more animation systems 850 may be configured to enable users to specify animation cues, paths, or the like according to one or more predefined sequences. The one or more animation systems 850 generate frames of the animation based on the animation cues or paths. In further embodiments, the one or more animation systems 850 may be configured to enable users to define animations using one or more animation languages, morphs, deformations, or the like.

The one or more object animations systems 850 may further generate animation data (e.g., inputs associated with controls or animations variables) for use by other elements of system 800 or that can be stored in object library 820. The one or more object animations systems 850 may be configured to allow a user to associate additional information, metadata, color, lighting, rigging, controls, or the like, with all or a portion of the generated animation data.

The one or more object simulation systems 860 can include hardware and/or software elements configured for simulating one or more computer-generated objects. Simulation can include determining motion and position of an object over time in response to one or more simulated forces or conditions. The one or more object simulation systems 860 may be invoked by or used directly by a user of the one or more design computers 810 and/or automatically invoked by or used by one or more processes associated with the one or more design computers 810.

In various embodiments, the one or more object simulation systems 860 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 860 may be used to simulate the behavior of objects, such as hair, fur, and cloth, in response to a physics model and/or animation of one or more characters and objects within a computer-generated scene.

The one or more object simulation systems 860 may further generate simulation data (e.g., motion and position of an object over time) for use by other elements of system 800 or that can be stored in object library 820. The generated simulation data may be combined with or used in addition to animation data generated by the one or more object animation systems 850. The one or more object simulation systems 860 may be configured to allow a user to associate additional information, metadata, color, lighting, rigging, controls, or the like, with all or a portion of the generated simulation data.

The one or more object rendering systems 870 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 870 may be invoked by or used directly by a user of the one or more design computers 810 and/or automatically invoked by or used by one or more processes associated with the one or more design computers 810. One example of a software program embodied as the one or more object rendering systems 870 can include PhotoRealistic RenderMan, or PRMan, produced by Pixar Animations Studios of Emeryville, Calif.

In various embodiments, the one or more object rendering systems 870 can be configured to render one or more objects to produce one or more computer-generated images or a set of images over time that provide an animation. The one or more object rendering systems 870 may generate digital images or raster graphics images.

In various embodiments, a rendered image can be understood in terms of a number of visible features. Some examples of visible features that may be considered by the one or more object rendering systems 870 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 870 may further render images (e.g., motion and position of an object over time) for use by other elements of system 800 or that can be stored in object library 820. The one or more object rendering systems 870 may be configured to allow a user to associate additional information or metadata with all or a portion of the rendered image.

Figure 9:
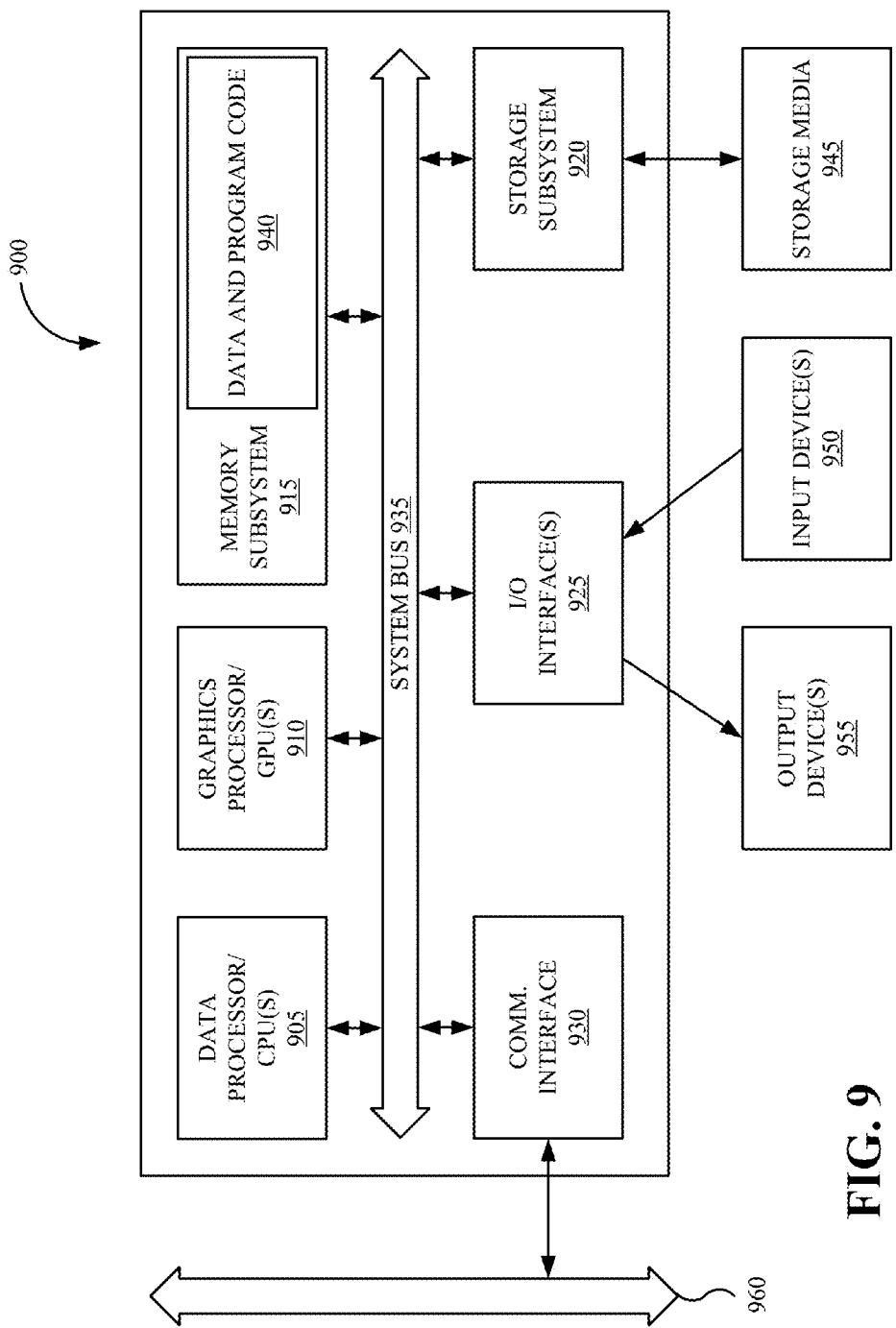
FIG. 9 is a block diagram of a computer system or information processing device that may incorporate an embodiment, be incorporated into an embodiment, or be used to practice any of the innovations, embodiments, and/or examples found within this disclosure.

FIG. 9 is a block diagram of computer system 900. FIG. 9 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 900 and any of its components or subsystems can include hardware and/or software elements configured for performing methods described herein.

Computer system 900 may include familiar computer components, such as one or more one or more data processors or central processing units (CPUs) 905, one or more graphics processors or graphical processing units (GPUs) 910, memory subsystem 915, storage subsystem 920, one or more input/output (I/O) interfaces 925, communications interface 930, or the like. Computer system 900 can include system bus 935 interconnecting the above components and providing functionality, such connectivity and inter-device communication The one or more data processors or central processing units (CPUs) 905 can execute logic or program code or for providing application-specific functionality. Some examples of CPU(s) 905 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 910 can execute logic or program code associated with graphics or for providing graphics-specific functionality. GPUs 910 may include any conventional graphics processing unit, such as those provided by conventional video cards. In various embodiments, GPUs 910 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 910 may include any number of registers, logic units, arithmetic units, caches, memory interfaces, or the like.

Memory subsystem 915 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 915 can include data and program code 940.

Storage subsystem 920 can also store information using machine-readable articles, information storage devices, or computer-readable storage media. Storage subsystem 920 may store information using storage media 945. Some examples of storage media 945 used by storage subsystem 920 can include floppy disks, hard disks, optical storage media such as CD-ROMS, DVDs and bar codes, removable storage devices, networked storage devices, or the like. In some embodiments, all or part of data and program code 940 may be stored using storage subsystem 920.

The one or more input/output (I/O) interfaces 925 can perform I/O operations. One or more input devices 950 and/or one or more output devices 955 may be communicatively coupled to the one or more I/O interfaces 925. The one or more input devices 950 can receive information from one or more sources for computer system 900. Some examples of the one or more input devices 950 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 950 may allow a user of computer system 900 to interact with one or more non-graphical or graphical user interfaces to enter a comment, select objects, icons, text, user interface widgets, or other user interface elements that appear on a monitor/display device via a command, a click of a button, or the like.

The one or more output devices 955 can output information to one or more destinations for computer system 900. Some examples of the one or more output devices 955 can include a printer, a fax, a feedback device for a mouse or joystick, external storage systems, a monitor or other display device, a communications interface appropriately configured as a transceiver, or the like. The one or more output devices 955 may allow a user of computer system 900 to view objects, icons, text, user interface widgets, or other user interface elements. A display device or monitor may be used with computer system 900 and can include hardware and/or software elements configured for displaying information.

Communications interface 930 can perform communications operations, including sending and receiving data. Some examples of communications interface 930 may include a network communications interface (e.g. Ethernet, Wi-Fi, etc.). For example, communications interface 930 may be coupled to communications network/external bus 960, such as a computer network, a USB hub, or the like. A computer system can include a plurality of the same components or subsystems, e.g., connected together by communications interface 930 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 900 may also include one or more applications (e.g., software components or functions) to be executed by a processor to execute, perform, or otherwise implement techniques disclosed herein. These applications may be embodied as data and program code 940. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 915 and/or storage subsystem 920.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

The following are the references cited in this paper.

[d'Eon and Irving 2011] d'Eon, E., and Irving, G. 2011. A quantized-diffusion model for rendering translucent materials. *ACM Transactions on Graphics (Proc. SIGGRAPH)* 30, 4, 56:1-56:14.

[d'Eon et~al. 2007] d'Eon, E., Luebke, D., and Enderton, E. 2007. Efficient rendering of human skin. *Rendering Techniques (Proc. Eurographics Symposium on Rendering)*, 147-

[Farrel et al. 1992] Farrell, T. J., Patterson, M. S., and Wilson, B. 1992. A diffusion theory model of spatially resolved, steady-state diffuse reflectance for the noninvasive determination of tissue optical properties in vivo. *Medical Physics* 19, 4, 879-888.

[Grosjean 1956] Grosjean, C. C. 1956. A high accuracy approximation for solving multiple scattering problems in infinite homogeneous media. *Il Nuovo Cimento* (1955-1965) 3, 1262-1275.

[Grosjean 1959] Grosjean, C. C. 1959. Multiple isotropic scattering in convex homogeneous media bounded by vacuum. In *Proc. Second International Conference on the Peaceful Uses of Atomic Energy*, vol. 413.

[Jensen et al. 2001] Jensen, H. W., Marschner, S. R., Levoy, M., and Hanrahan, P. 2001. A practical model for subsurface light transport. *Computer Graphics (Proc. SIGGRAPH)* 35, 511-518.

[Kienle and Patterson 1997] Kienle, A., and Patterson, M. S. 1997. Improved solutions of the steady-state and the time-resolved diffusion equations for reflectance from a semi-infinite turbid medium. *Journal of the Optical Society of America A* 14, 1, 246-254.

What is claimed is:

1. A method of image processing, wherein a computer system processes a geometric model to generate a rendered image corresponding to a camera view of a virtual space containing the geometric model, the method comprising performing, by one or more processors of the computer system:

determining a boundary of a translucent object in the geometric model that is to be displayed in the rendered image, the translucent object having one or more parameters that define subsurface scattering properties of the translucent object;

identifying an illumination source that provides one or more beams for use in generating the rendered image;

for each of the one or more beams:
  determining an intersection of the beam with the boundary;
  identifying a plurality of locations on the boundary of the translucent object;
  at each of the plurality of locations, determining a contribution to a radiant exitance value resulting from the beam by:
    performing importance sampling to select N points along the beam according to a probability distribution function, the N points being within the translucent object, wherein each of the N points has a probability distribution function value;
    calculating a radiant value of a function at each of the N points, the function being dependent on the one or more parameters of the translucent object;
    computing a sum of the radiant values weighted by the corresponding probability distribution function values.

2. The method of claim 1, wherein the importance sampling uses a probability density function that decreases exponentially with distance along the beam.

3. The method of claim 1, wherein the importance sampling uses linear decreasing angular sampling.

4. The method of claim 1, wherein the importance sampling uses a first probability density function that is uniform with respect to the angular domain subtended by the beam, the angular domain being measured with respect to the location on the boundary.

5. The method of claim 4, wherein the importance sampling also uses a second probability density function that decreases exponentially with distance along the beam.

6. The method of claim 5, wherein the first probability density function is used for locations within a specific distance of the intersection, and the second probability density function is used for location more than a specified distance from the intersection.

7. The method of claim 6, wherein both the first probability density function and the second probability density function are used in a transition region according to a blending function.

8. The method of claim 1, wherein the contribution to the radiant exitance value from the N points along the beam is weighted by a correction factor based on the respective distances of the N points from the boundary of the translucent object.

9. The method of claim 1, wherein the plurality of locations on the boundary of the translucent object form a grid, further comprising:

storing the radiant exitance values at the plurality of locations;
receiving a request to determine a first radiant exitance value at a first location that is not one of the plurality of locations;
identifying two or more of the plurality of locations that are in proximity to the first location; and
determining the first radiant exitance value based on the radiant exitance values at the two or more locations in proximity to the first location.

10. The method of claim 9, wherein determining the first radiant exitance includes:

interpolating between the radiant exitance values at the two or more locations in proximity to the first location.

11. The method of claim 10, further comprising using a cubic polynomial for interpolation.

12. A computer product comprising a non-transitory computer readable medium storing a plurality of instructions that when executed, by one or more processors of a computer system, control the computer system to process a geometric model to generate a rendered image corresponding to a camera view of a virtual space containing the geometric model, the instructions comprising:
  identifying an illumination source that provides one or more beams that is to be displayed in the rendered image;
  determining a boundary of a translucent object in the geometric model for use in generating the rendered image, the translucent object having one or more parameters that define subsurface scattering properties of the translucent object;
  for each of the one or more beams:
    determining an intersection of the beam with the boundary;
    identifying a plurality of locations on the boundary of the translucent object;
    at each of the plurality of locations, determining a contribution to a radiant exitance value resulting from the beam by:
      performing importance sampling to select N points along the beam according to a probability distribution function, the N points being within the translucent object, wherein each of the N points has a probability distribution function value;
      calculating a radiant value of a function at each of the N points, the function being dependent on the one or more parameters of the translucent object;
      computing a sum of the radiant values weighted by the corresponding probability distribution function values.

13. The computer product of claim 12, wherein the importance sampling uses a probability density function that decreases exponentially with distance along the beam.

14. The computer product of claim 12, wherein the importance sampling uses a first probability density function that is uniform with respect to the angular domain subtended by the beam, the angular domain being measured with respect to the location on the boundary.

15. The computer product of claim 14, wherein the importance sampling also uses a second probability density function that decreases exponentially with distance along the beam.

16. The computer product of claim 15, wherein the first probability density function is used for locations within a specific distance of the intersection, and the second probability density function is used for locations more than a specified distance from the intersection.

17. The computer product of claim 16, wherein both the first probability density function and the second probability density function are used in a transition region according to a blending function.

18. The computer product of claim 12, wherein the contribution to the radiant exitance value from the N points along the beam is weighted by a correction factor based on the respective distance of the N points from the boundary of the translucent object.

19. The computer product of claim 12, wherein the plurality of locations on the boundary of the translucent object form a grid, further comprising:
  storing the radiant exitance values at the plurality of locations;
  receiving a request to determine a first radiant exitance value at a first location that is not one of the plurality of locations;
  identifying two or more of the plurality of locations that are in proximity to the first location; and
  determining the first radiant exitance value based on the radiant exitance values at the two or more locations in proximity to the first location.

20. The computer product of claim 19, wherein determining the first radiant exitance includes:
  interpolating between the radiant exitance values at the two or more locations in proximity to the first location.

* * * * *